(12) United States Patent
Bendetti

(10) Patent No.: US 10,123,136 B2
(45) Date of Patent: *Nov. 6, 2018

(54) ASSISTIVE HEARING DEVICE FOR USE WITH A TELEPHONE AND A HEARING AID

(71) Applicant: Richard J. Bendetti, Malibu, CA (US)

(72) Inventor: Richard J. Bendetti, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,750

(22) Filed: Jun. 12, 2017

(65) Prior Publication Data

US 2017/0280259 A1    Sep. 28, 2017

Related U.S. Application Data

(63) Continuation of application No. 15/076,294, filed on Mar. 21, 2016, now Pat. No. 9,681,237.

(60) Provisional application No. 62/194,780, filed on Jul. 20, 2015, provisional application No. 62/136,272, filed on Mar. 20, 2015.

(51) Int. Cl.
*H04M 1/19* (2006.01)
*H04R 25/00* (2006.01)
*H04M 1/725* (2006.01)
*H04M 1/02* (2006.01)

(52) U.S. Cl.
CPC ........ *H04R 25/60* (2013.01); *H04M 1/72591* (2013.01); *H04M 1/0254* (2013.01); *H04R 2225/021* (2013.01); *H04R 2499/11* (2013.01)

(58) Field of Classification Search
USPC .................................. 379/37–52; 455/575.1
See application file for complete search history.

(56) References Cited

U.S. PATENT DOCUMENTS

| | | | | |
|---|---|---|---|---|
| 4,483,414 A | * | 11/1984 | Tanaka | H04R 1/222 381/359 |
| 4,905,276 A | * | 2/1990 | Catey | H04M 1/19 379/441 |
| 2003/0040345 A1 | * | 2/2003 | Berger | H01Q 1/245 455/575.1 |
| 2008/0240418 A1 | * | 10/2008 | Amron | H04M 1/05 379/449 |

(Continued)

*Primary Examiner* — Maria El-Zoobi
(74) *Attorney, Agent, or Firm* — Martin & Ferraro, LLP

(57) ABSTRACT

An assistive hearing device having a sound entrance aperture on a first side, the sound entrance aperture placed against a voice emitting speaker (or receiver) of the telephone, a sound egress aperture on a second side opposite the first side, and the sound egress aperture located within closer proximity to a hearing device relative to the sound entrance aperture and the speaker to facilitate transmission of sound from the speaker to the hearing device located nearby is provided. The assistive hearing device includes a hollow interior, which connects the sound entrance and sound egress apertures, and allows sound waves entering the sound entrance aperture to travel through the hollow interior and exit the sound egress aperture. The sound entrance aperture of the assistive hearing device surrounds the speaker of the mobile device to capture sound waves transmitted from the speaker. The transmitted sound waves enter the sound entrance aperture, traverse through the hollow interior of the assistive hearing device and exit the sound egress aperture, which is located within closer proximity to the hearing device microphone relative to the sound entrance aperture and to the telephone speaker.

11 Claims, 17 Drawing Sheets

(56) References Cited

U.S. PATENT DOCUMENTS

2016/0277556 A1 9/2016 Bendetti

* cited by examiner

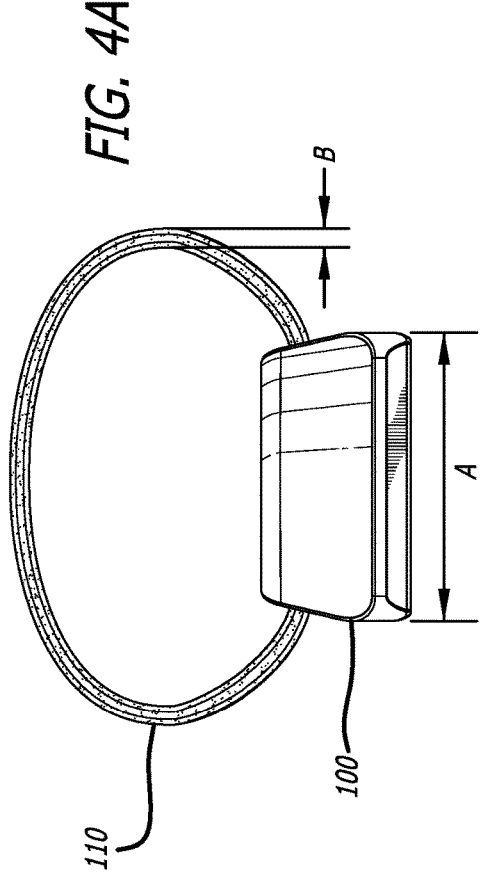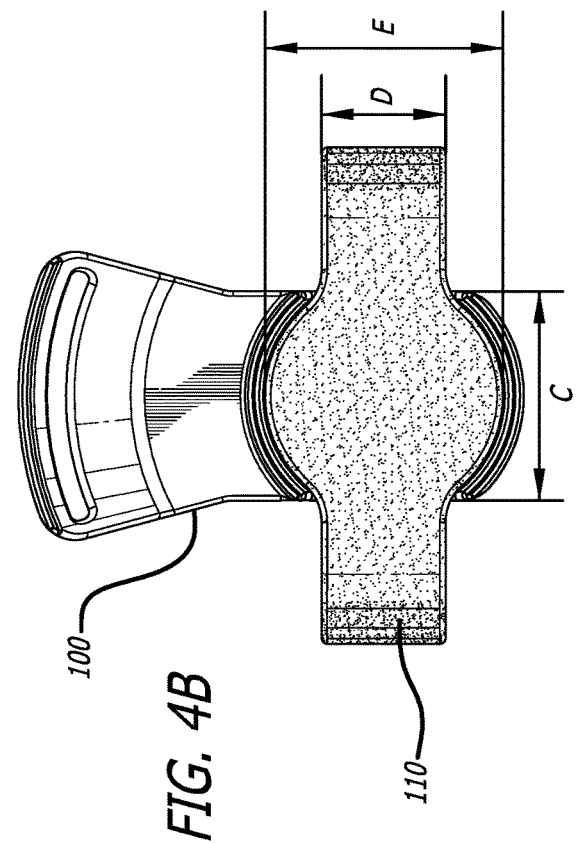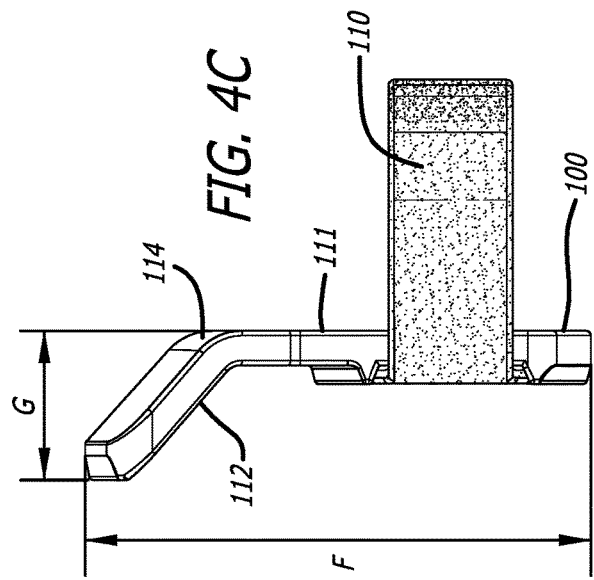

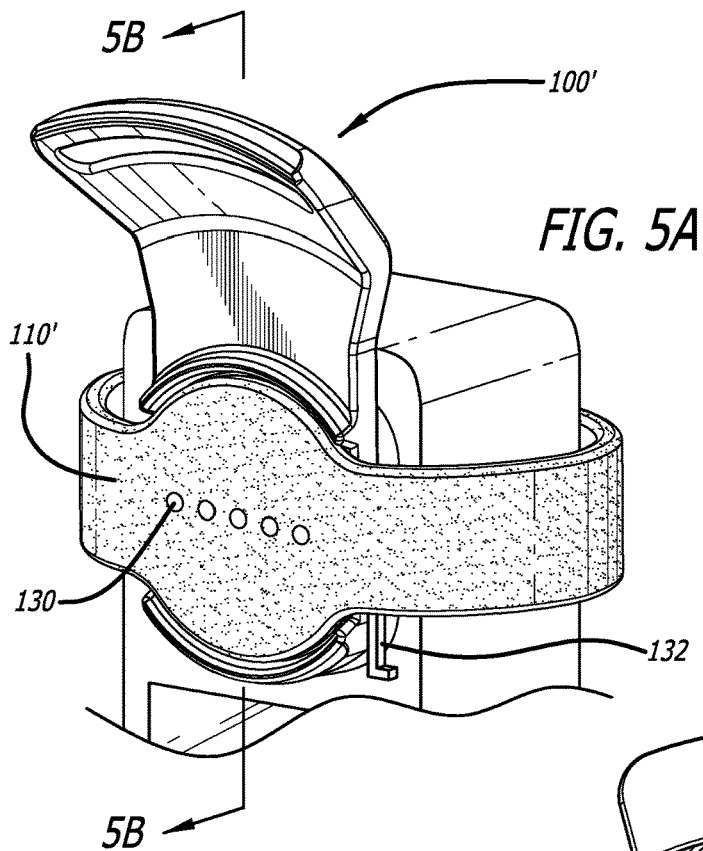
FIG. 5A
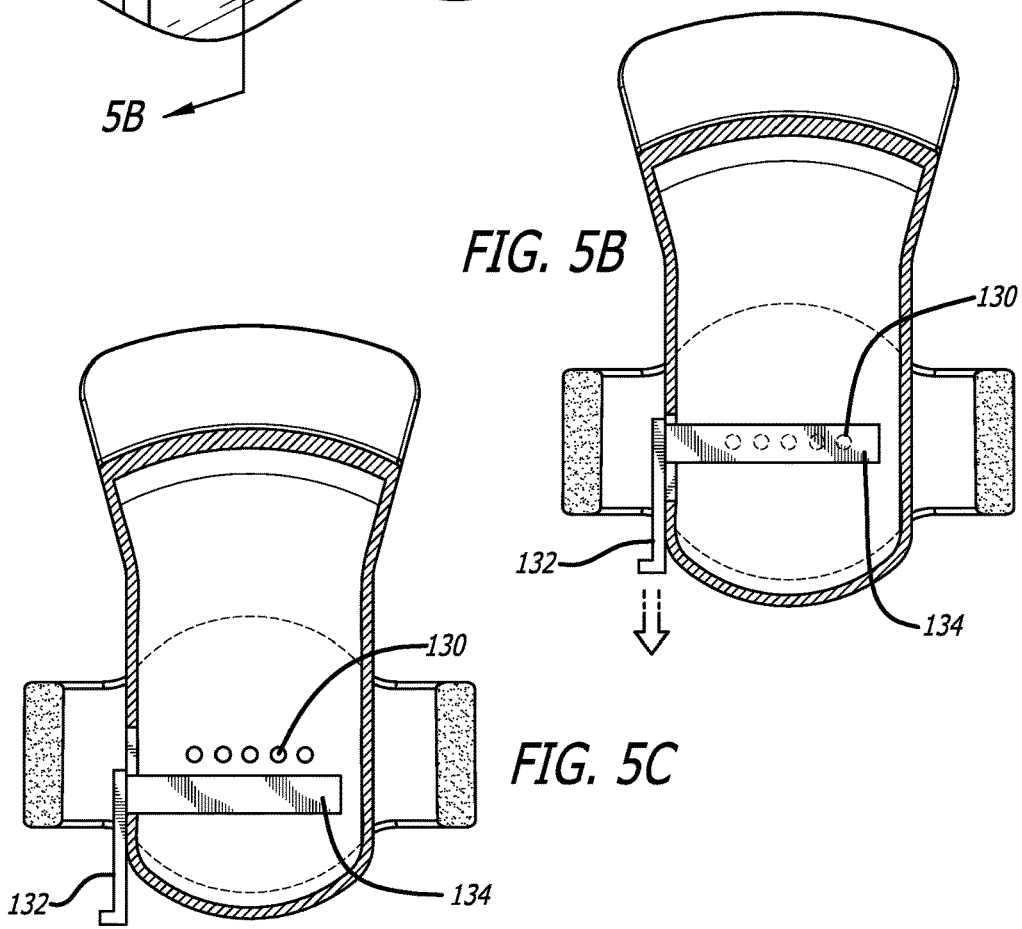
FIG. 5B
FIG. 5C

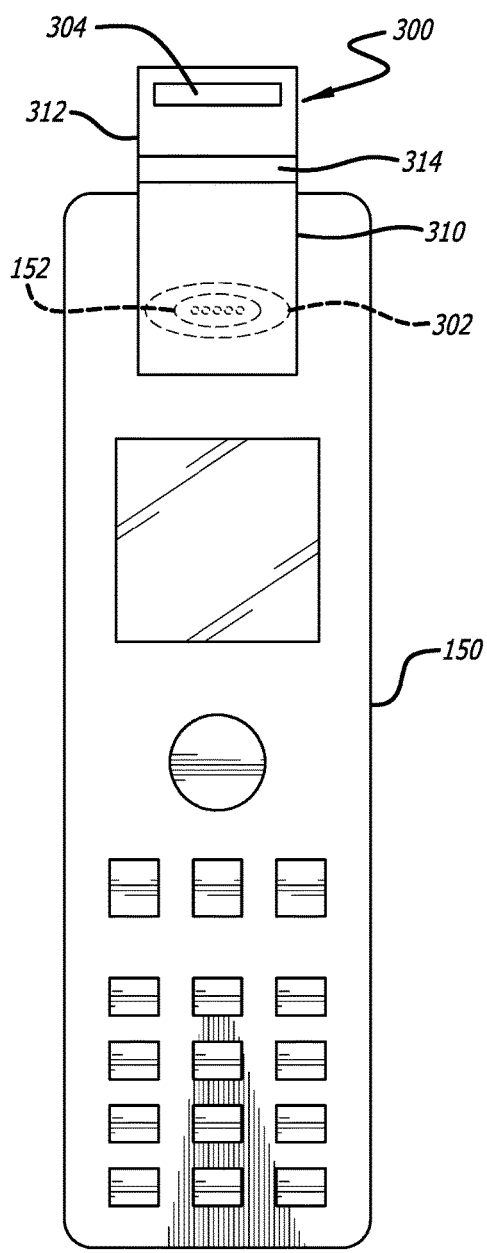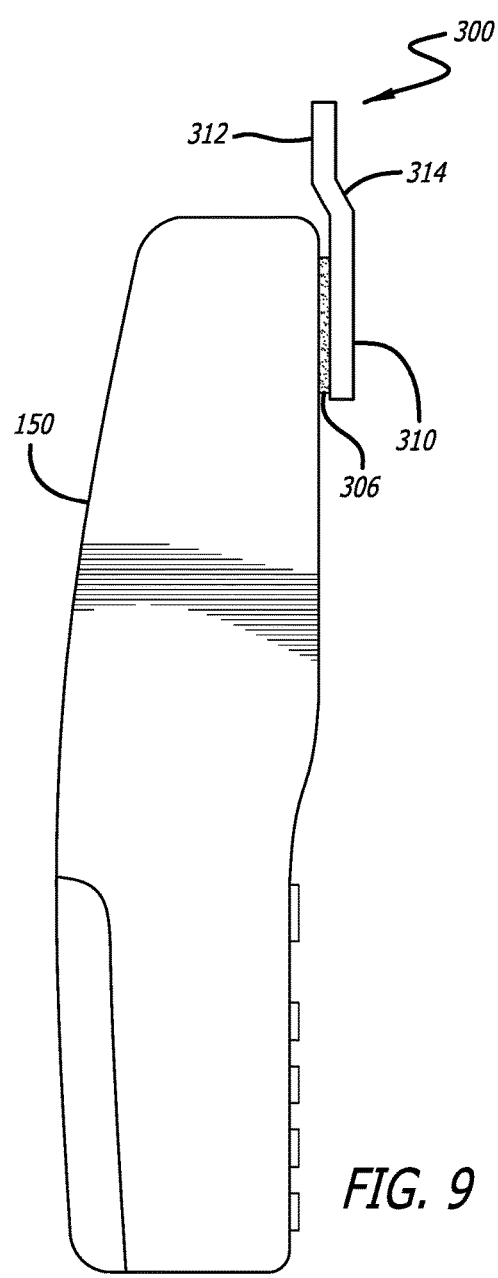
FIG. 8
FIG. 9

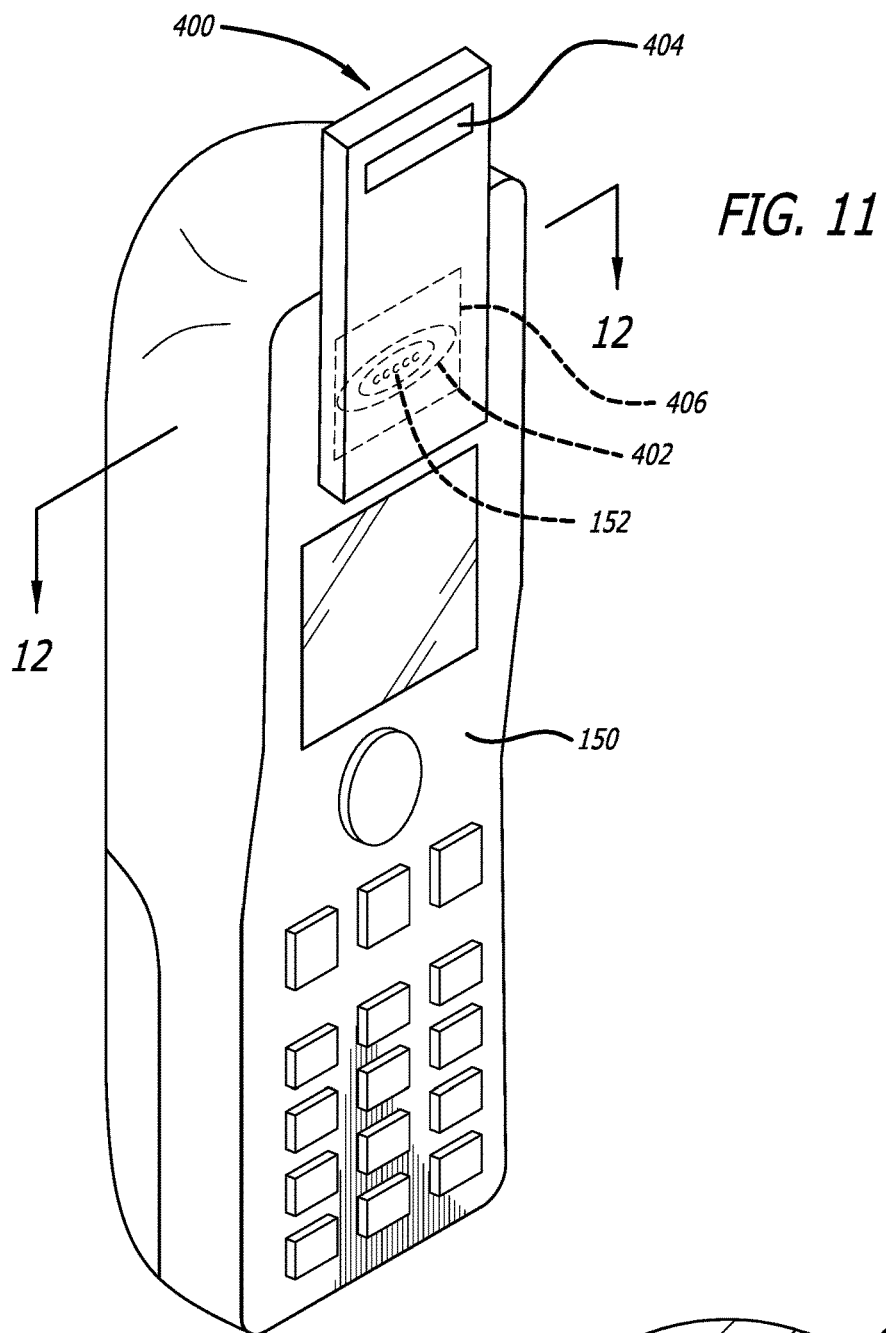
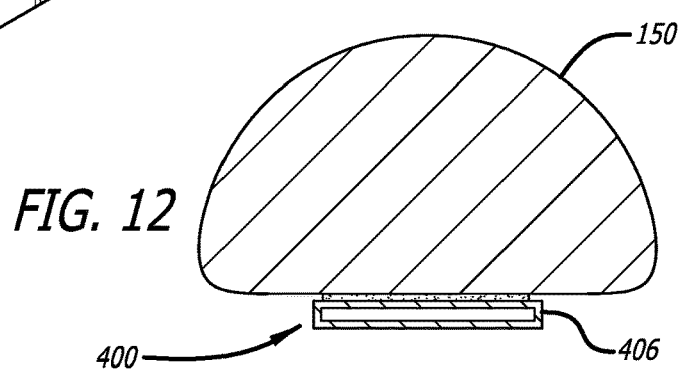

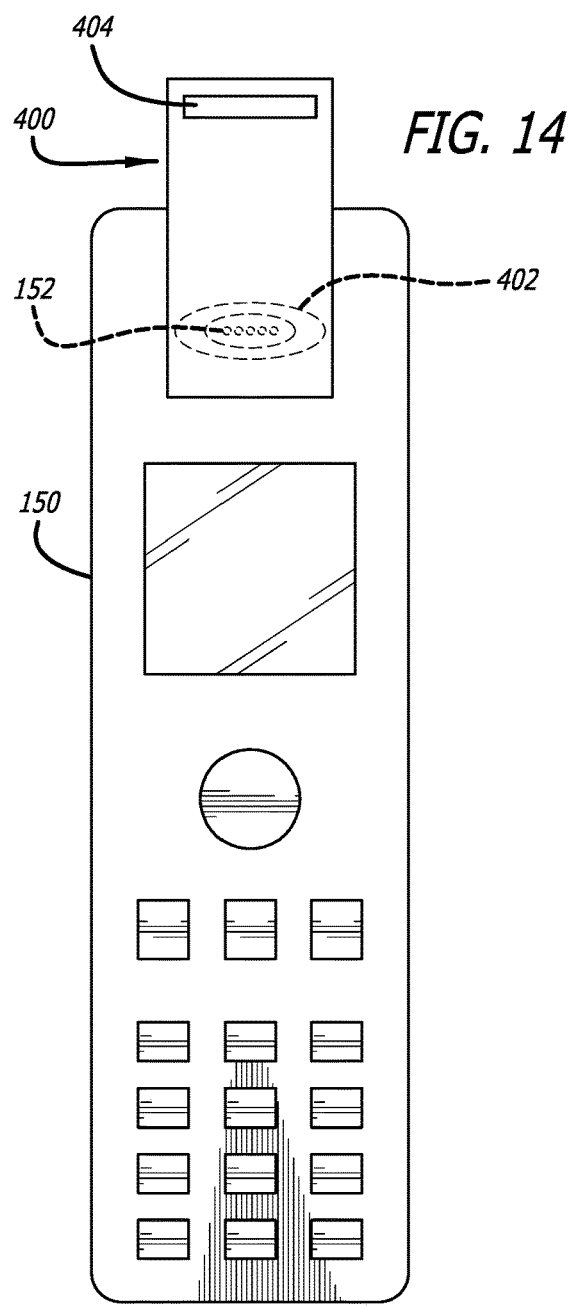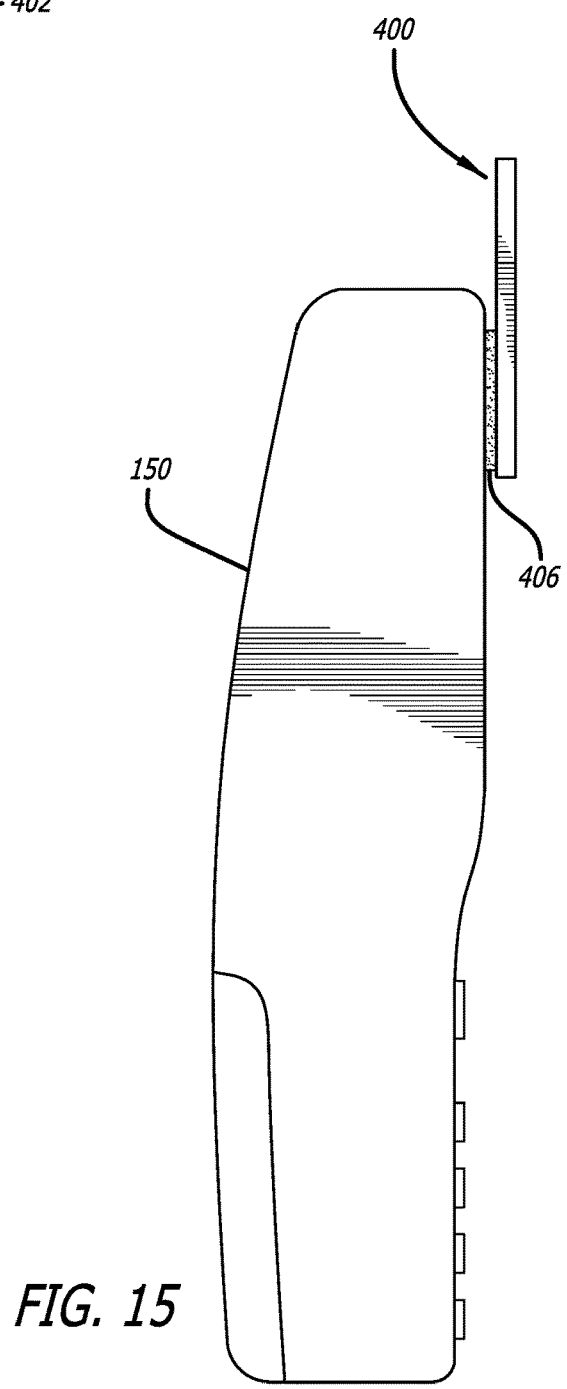
FIG. 14
FIG. 15

ASSISTIVE HEARING DEVICE FOR USE WITH A TELEPHONE AND A HEARING AID

The present application is a continuation of U.S. application Ser. No. 15/076,294 filed Mar. 21, 2016 (Publication No. 2016/0277556), which is pending; which claims benefit of Provisional Application Nos. 62/136,272 filed Mar. 20, 2015 and 62/194,780 filed Jul. 20, 2015; all of which are incorporated by reference herein.

BACKGROUND

According to the World Health Organization, over 5% of the world's population—360 million people—have disabling hearing loss (328 million adults and 32 million children). Approximately one-third of people over 65 years of age are affected by disabling hearing loss. Disabling hearing loss refers to hearing loss greater than 40 dB in the better hearing ear in adults and a hearing loss greater than 30 dB in the better hearing ear in children.

Hearing aids are electrical devices that assist in optimizing perception of speech or other sounds. Most hearing aids are designed for hearing impaired individuals, of which there are approximately 37 million in the United States. Hearing aid unit sales in 2013 came very close to topping the 3-million unit mark for the first time in industry history. Industry experts are projecting 4 million unit sales by 2020.

Even though hearing aids can have a substantial impact on mitigating hearing loss, use of hearing aids with mobile or cordless telephones can be problematic. The configuration of Behind the Ear (BTE) or Receiver in the Canal (RIC) hearing aids can impede transfer of the sound from the voice emitting speaker (or receiver) of telephones thereto. For example, the position of the microphones of BTE hearing aids is often removed from the traditional placement of the voice emitting speakers of such telephones adjacent the ear. To illustrate, a user of a BTE hearing aid can oftentimes hear the phone ring, but cannot clearly hear callers due to the BTE hearing aid ear mold obstruction preventing the transfer of sounds from the voice emitting speaker.

Therefore, there is a need for a device facilitating the transfer of sounds from the voice emitting speaker of a telephone to a hearing aid.

The assistive hearing device described herein is designed to improve communication on telephones, including cordless or mobile phones, for people who wear BTE or RIC hearing aids. The assistive hearing device eliminates the need to place a phone receiver behind the ear to obtain the clearest sound. The assistive hearing device redirects telephonic sound via an acoustical accumulator and director to the microphone of the hearing aid located behind the ear or in the ear canal of the user. The acoustical accumulator and director extends beyond the top of the phone whereby it redirects the telephonic sound from the phone closer to where the BTE or RIC microphone is located.

SUMMARY OF THE INVENTION

In its simplest form, the assistive hearing device consists of a small outer case having opposite top and bottom ends, with a sound entrance aperture proximate the bottom end of the assistive hearing device, which is coupled (preferably with an elastic band, an adhesive material, or a hook and loop fastener) to the phone and a sound exit aperture located proximate the top end of the assistive hearing device. The two apertures are located approximately 1.5 to 2 inches apart. The assistive hearing device does not require a power source and is easy to install. The assistive hearing device adheres to the receiver end of a phone via a small O-Gasket creating a secure and soundproof seal. The O-Gasket material used to adhere the device to the phone can be, for example, a custom made high-density polyethylene film with double-sided synthetic rubber adhesive or a high friction rubber material.

In accordance with the present invention, an assistive hearing device having a sound entrance aperture on a first side, the sound entrance aperture placed against a voice emitting speaker (or receiver) of the telephone, a sound egress aperture on a second side opposite the first side, and the sound egress aperture located within closer proximity to a hearing device relative to the sound entrance aperture and the speaker to facilitate transmission of sound from the speaker to the hearing device located nearby is provided. The assistive hearing device includes a hollow interior, which connects the sound entrance and sound egress apertures, and allows sound waves entering the sound entrance aperture to travel through the hollow interior and exit the sound egress aperture. The sound entrance aperture of the assistive hearing device surrounds the speaker of the mobile device to capture sound waves transmitted from the speaker. The transmitted sound waves enter the sound entrance aperture, traverse through the hollow interior of the assistive hearing device and exit the sound egress aperture, which is located within closer proximity to the hearing device microphone relative to the sound entrance aperture and to the telephone speaker.

While most telephone speakers are designed to be placed against the ear of a user adjacent to the ear opening leading to the ear canal, the assistive hearing device takes into account that many hearing devices are worn behind the ear, which is at the opposite side of the ear opening. Specifically, the sound egress aperture is located on an opposite side of the sound entrance aperture to direct sound waves that enter the sound entrance aperture to the sound egress aperture, which is in closer proximity and oriented on the same side with respect to the BTE hearing aid microphone.

The assistive hearing device may include an adhesive portion that contains an adhesive material that is bonded to a surface surrounding the sound entrance aperture of the assistive hearing device. A removable strip can be removably attached to the adhesive material bonded to the first adhesive containing portion. The removable strip covers the adhesive material until it becomes desirable to attach the assistive hearing device to the mobile phone. The assistive hearing device may be connected to a strap, which straps the assistive hearing device to the mobile device. The assistive hearing device also may be connected to the mobile device by an elastic/silicone band or a band securable by hook and loop that fastens at its ends. The band may be adjusted to fit a variety of phone sizes and shapes.

The assistive hearing device of the present invention can be constructed from a variety of materials, including but not limited to plastic, metallic, compound materials, etc. Furthermore, the assistive hearing device may be constructed into a variety of shapes and sizes to account for the distance between the phone speaker and the input/microphone of the hearing device.

BRIEF DESCRIPTION OF THE DRAWINGS

The accompanying drawings, which are included to provide further understanding of the present invention disclosed in the present disclosure and are incorporated in and constitute a part of this specification, illustrate aspects of the present invention and together with the description serve to explain the principles of the present invention. In the drawings:

FIG. 4A is a top plan view of the first embodiment of the assistive hearing device of FIG. 1 coupled with the band;

FIG. 4B is a front elevational view of the first embodiment of the assistive hearing device of FIG. 1 coupled with the band;

FIG. 4C is a side elevational view of the first embodiment of the assistive hearing device of FIG. 1 coupled with the band;

FIG. 5A is a partial front perspective view of a telephone with a second embodiment of an assistive hearing device of the present invention with a band having sound openings;

FIG. 5B is a cross-sectional view taken along line 5B-5B of the second embodiment of the assistive hearing device of FIG. 5A with a sliding cover in the closed position;

FIG. 5C is a cross-sectional view taken along line 5B-5B of the second embodiment of the assistive hearing device of FIG. 5A with the sliding cover in the open position;

FIG. 8 is a front elevational view of the telephone with the fourth embodiment of the assistive hearing device of FIG. 7A;

FIG. 9 is a side elevational view of the telephone with the fourth embodiment of the assistive hearing device of FIG. 7A;

FIG. 11 is a front perspective view of a telephone with a fifth embodiment of the assistive hearing device of the present invention;

FIG. 12 is a cross-sectional view taken along line 12-12 of the telephone and the fifth embodiment of the assistive hearing device of FIG. 11;

FIG. 14 is front elevational view of the telephone with the fifth embodiment of the assistive hearing device of FIG. 11;

FIG. 15 is a side elevational view of the telephone with the fifth embodiment of the assistive hearing device of FIG. 11;

DETAILED DESCRIPTION OF THE PREFERRED EMBODIMENT

The detailed description set forth below is intended as a description of various configurations of the present invention and is not intended to represent the only configurations in which the present invention may be practiced. It will be apparent, however, to those skilled in the art that the present invention is not limited to the specific details set forth herein and may be practiced without these specific details.

Various embodiments of an assistive hearing device according to the present invention are described below. Each of these embodiments serve in redirecting telephonic sound via an acoustical accumulator and director to the microphone of a hearing aid located behind the ear or in the ear canal of the user. To that end, the embodiments of the assistive hearing device employ a sound entrance aperture, a sound egress aperture, and a sound conduit formed by a hollow interior of the devices to transmit telephonic sound to the microphone of a hearing aid.

Figure 1:
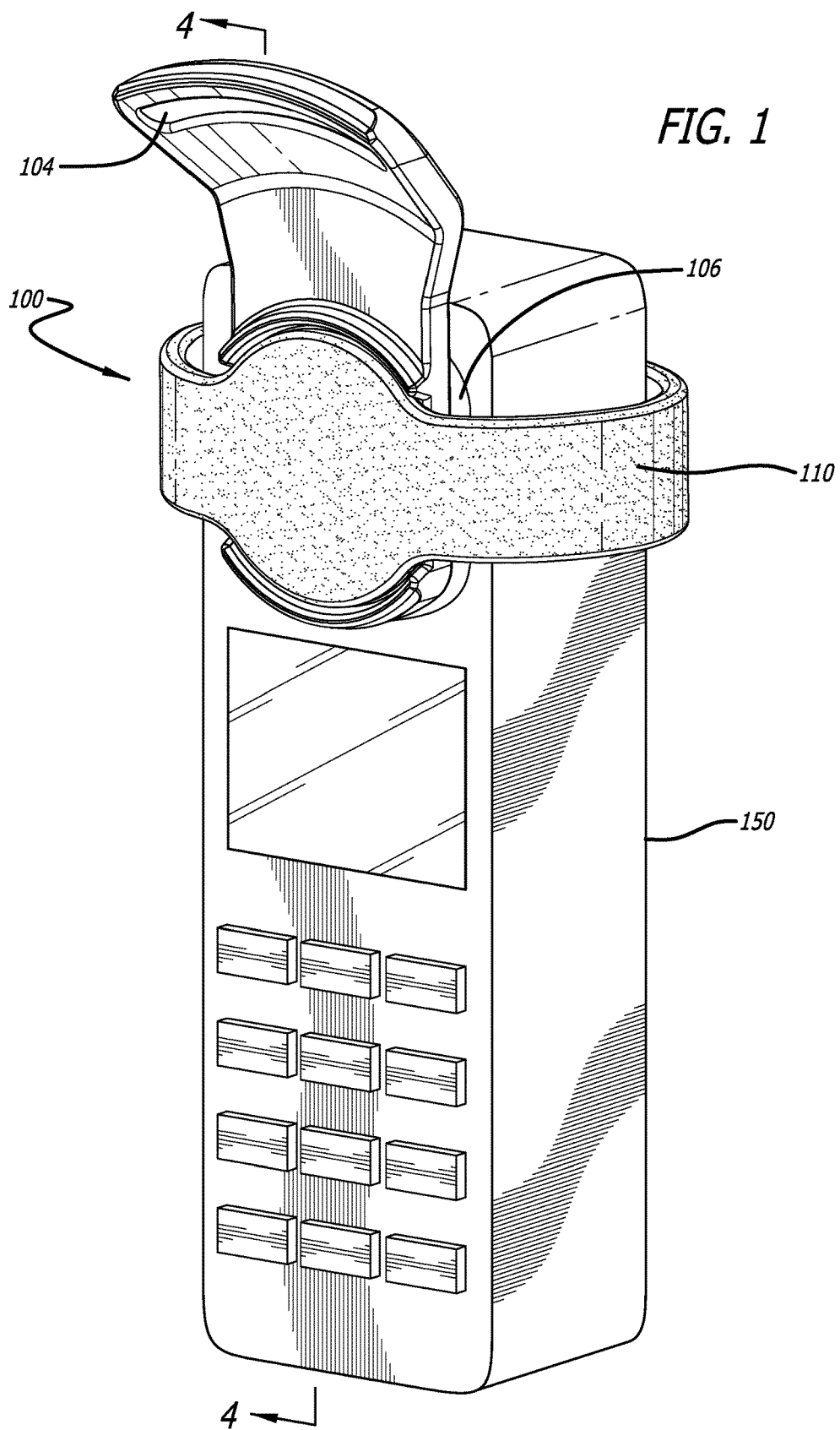
FIG. 1 is a front perspective view of a telephone with a first embodiment of an assistive hearing device of the present invention having a band for connecting to the telephone.

FIGS. 1, 2A, 3, and 4 illustrate an assistive hearing device 100 in accordance with a preferred embodiment of the present invention. As shown in FIG. 1, in accordance with a preferred embodiment, assistive hearing device 100 includes a band 110, a sound egress aperture 104, and a spacer 106. Band 110 is preferably made of an elastic material such as silicone or rubber and is placed around a phone 150 to secure assistive hearing device 100 to phone 150. In a preferred embodiment, assistive hearing device 100 has molded arcs to engage the circular portion of band 110. Examples of phone 150 may include conventional telephone handsets, wireless handsets, or a mobile phones.

Figure 2A:
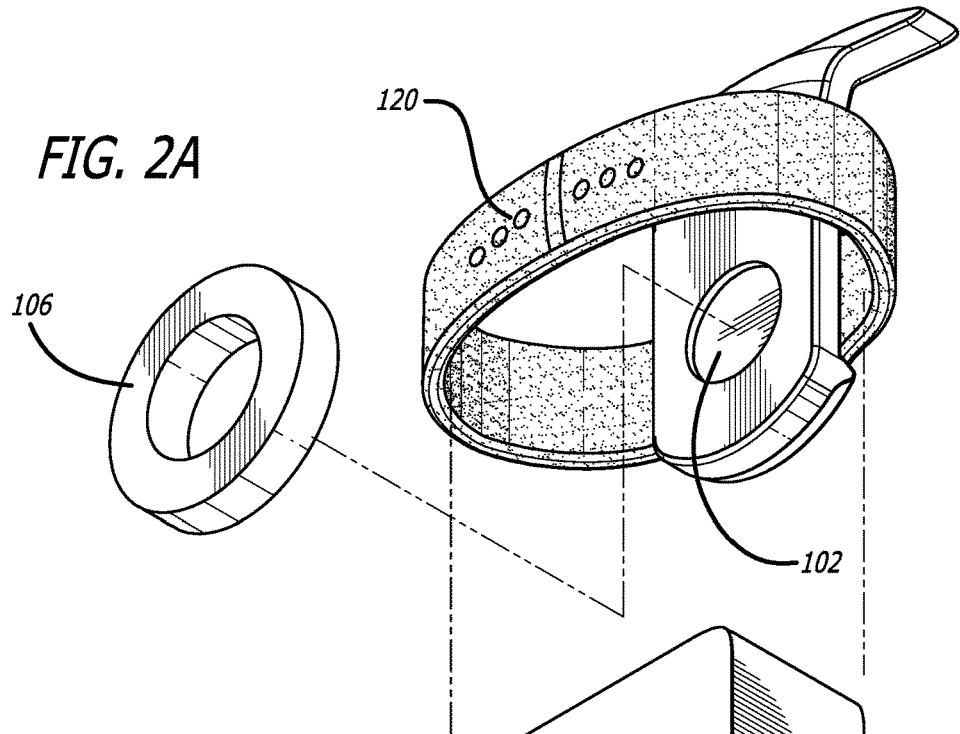
FIG. 2A is an exploded rear perspective view of the telephone with the first embodiment of the assistive hearing device of FIG. 1 showing the band and a spacer.

Referring to FIG. 2A, spacer 106 of assistive hearing device 100 is positioned against the surface of phone 150 surrounding a sound entrance aperture 102 of assistive hearing device 100. When placed on phone 150 (FIG. 4), spacer 106 preferably surrounds a voice emitting speaker (or receiver) 152 of phone 150. Spacer 106 may be in the form of a donut seal, but is not limited to such a configuration.

Assistive hearing device 100 is fixed relative to phone 150 by band 110 so that sound from voice emitting speaker 152 can be conducted through spacer 106 and into sound entrance aperture 102 for transmission through a hollow interior 108 of assistive hearing device 100. Spacer 106 is preferably made of a high friction rubber to prevent assistive hearing device 100 and phone 150 from sliding relative to each other.

In a preferred embodiment, one end of band 110 is adjustable and has a plurality of holes 120 and the opposite end has a plurality of pegs 122 projecting from band 110. Band 110 is placed around phone 150 and the length of band 110 may be adjusted by securing pegs 122 into selected holes 120 depending on the configuration and size of phone 150.

Figure 2B:
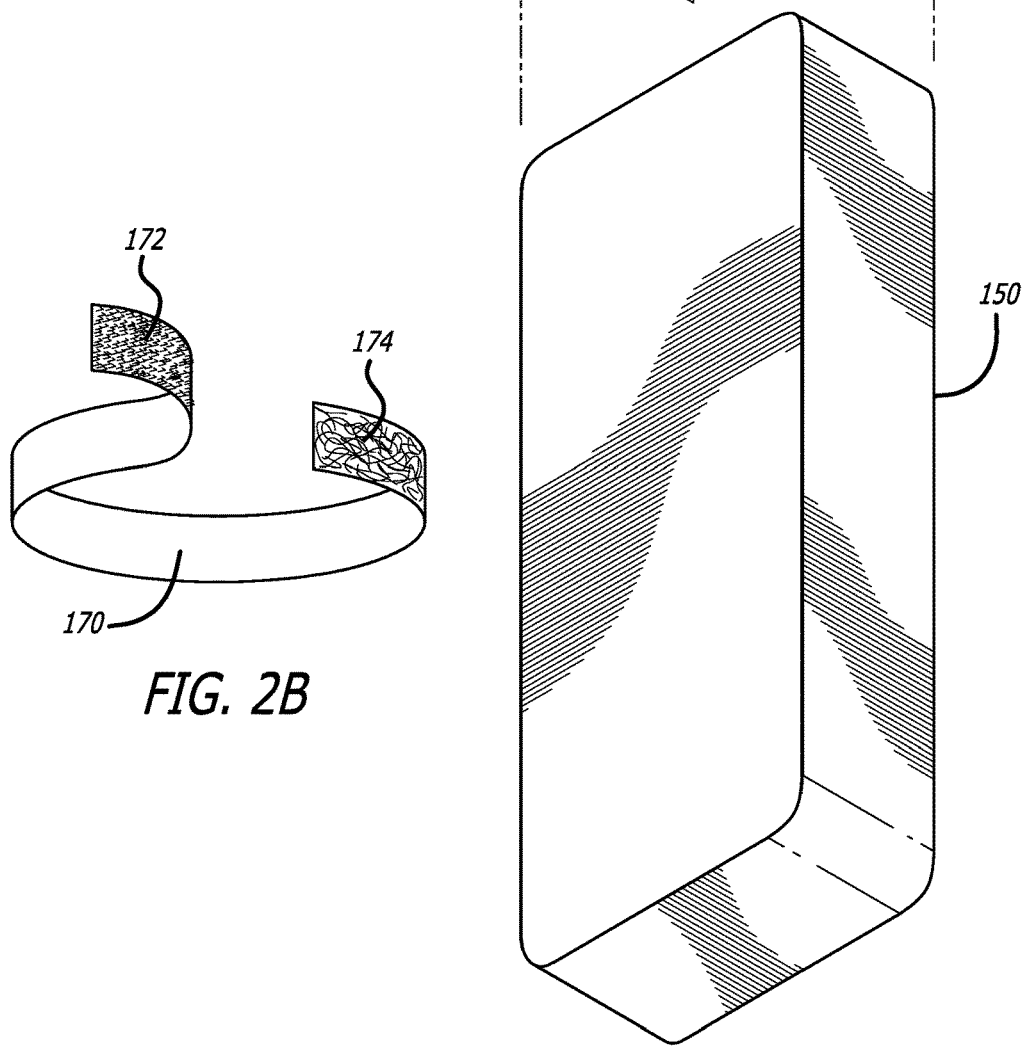
FIG. 2B is a perspective view of a hook and loop fastener for connecting the assistive hearing device to the telephone.

Referring to FIG. 2B, in another preferred embodiment, assistive hearing device 100 includes a band 170 with a hook and loop fastener at its end to removably secure assistive hearing device 100 to phone 150. One end of band 170 having a hook part 172 is attachable to the opposite end of band 170 having a loop part 174 by positioning and pressing the two ends together. When the two ends are pressed together, band 170 fastens at its ends and binds together assistive hearing device 100 and phone 150.

Figure 3:
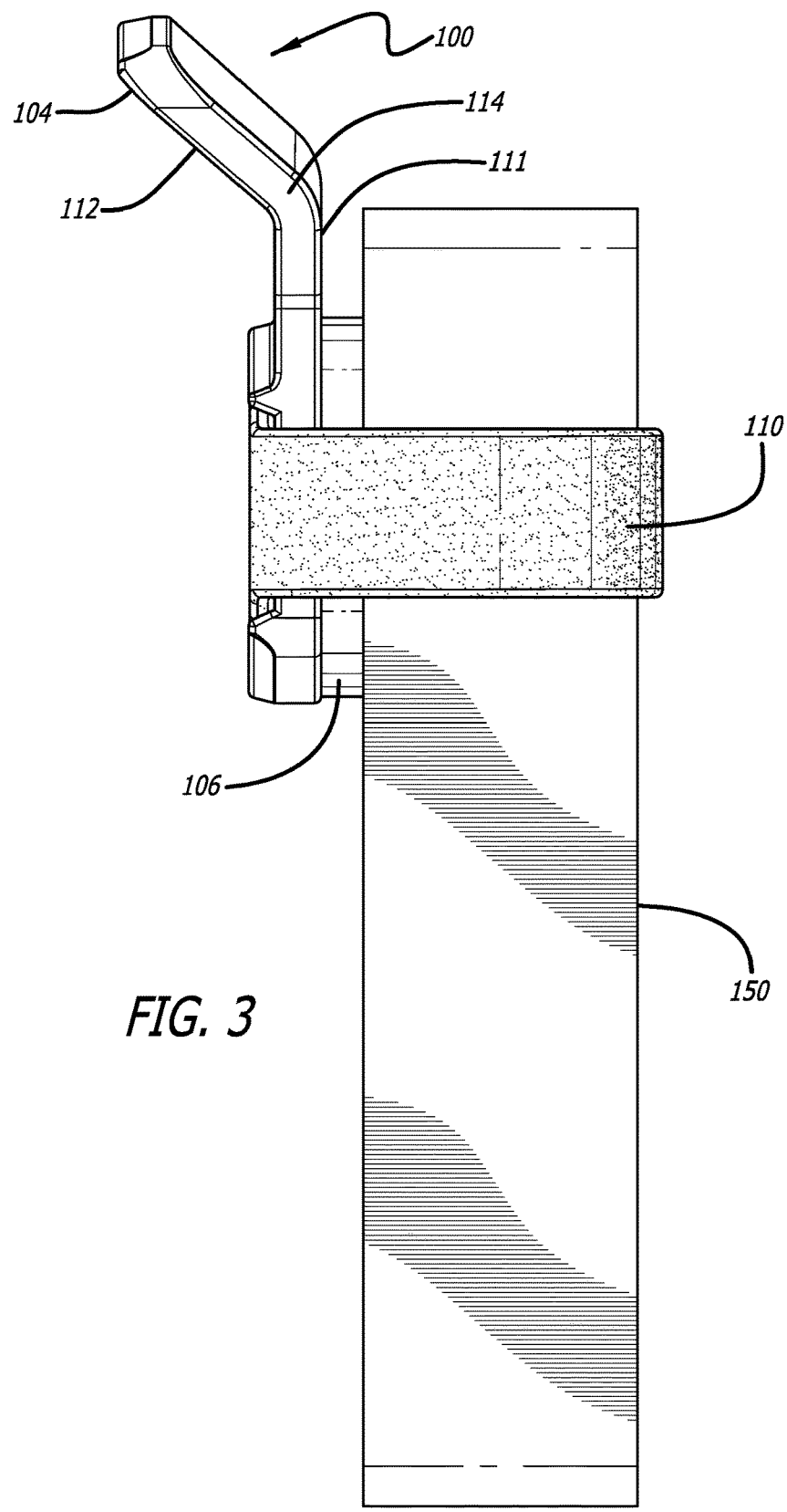
FIG. 3 is a side elevational view of the telephone with the first embodiment of the assistive hearing device of FIG. 1.
Figure 4:
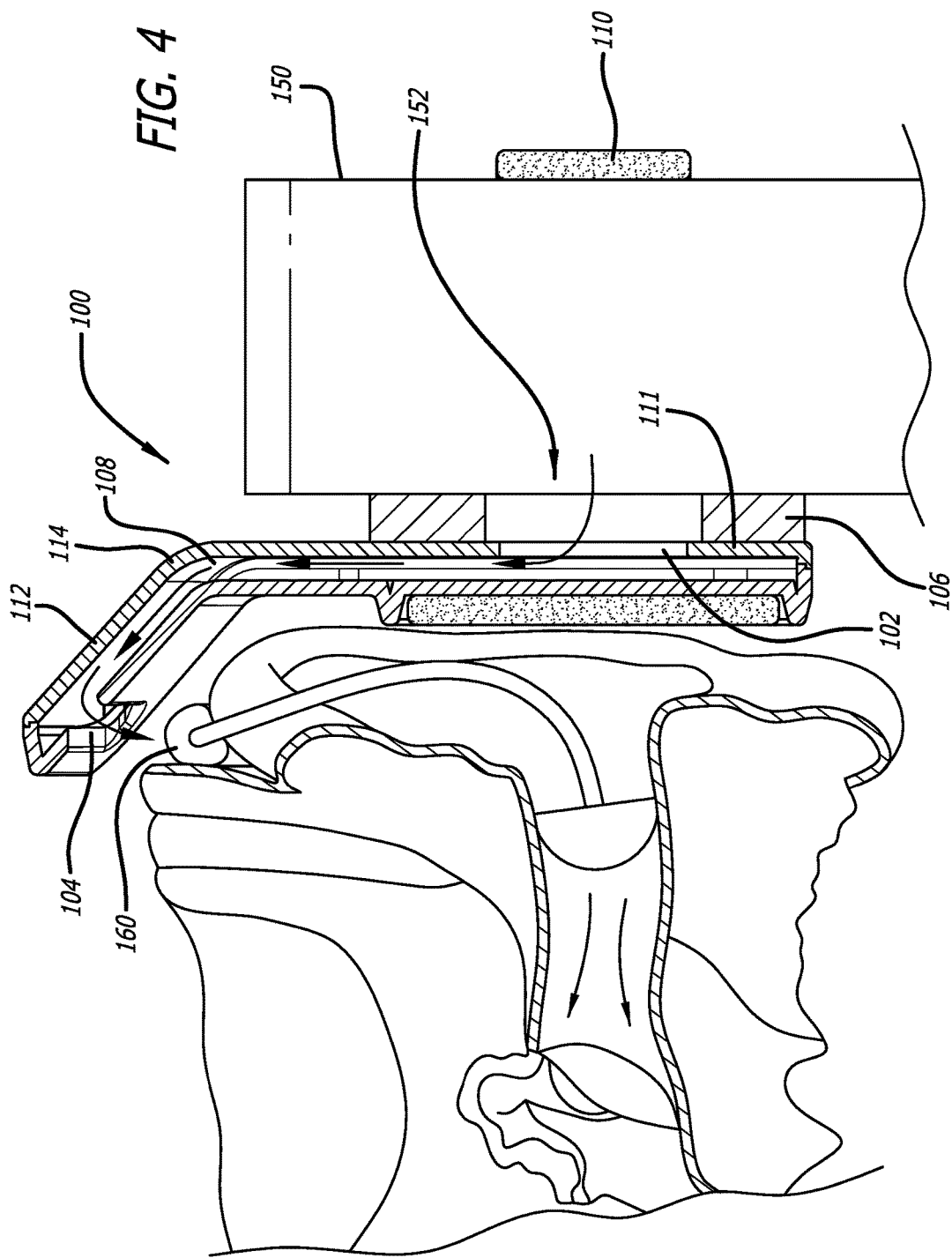
FIG. 4 is a partial side elevational view of the telephone with a partial cross-sectional view taken along line 4-4 of the first embodiment of the assistive hearing device of FIG. 1, the arrows illustrating a direction of sound generated from the voice emitting speaker of the telephone traveling into a sound entrance aperture, through a hollow interior of the assistive hearing device, out of a sound egress aperture, and to a Behind the Ear (BTE) or Receiver in the Canal (RIC) hearing aid of a user also depicted therein.

Referring to FIG. 3, assistive hearing device 100 includes a first portion 111 and a second portion 112. Assistive hearing device 100 is configured such that second portion 112 is offset approximately 0.25 to 0.75 inches from first portion 111 to permit sound egress aperture 104 to be position proximate a BTE hearing aid 160. An angled transition portion 114 positioned between first and second portions 111 and 112 creates the offset position of second portion 112 relative to first portion 111. As depicted in FIG. 4, the offset position of second portion 112 provides for the transmission of sound from sound egress aperture 104 towards BTE hearing aid 160 in a manner that is not impeded by the user's ear or any other portion other user's head against which phone 150 is placed. The offset configuration offers the added advantage of reducing the chances of muffling the sound in the event the user presses assistive hearing device 100 against a portion of the user's ear or head to block sound egress aperture 104.

Referring to FIG. 4, with assistive hearing device 100 coupled to phone 150, sound can be directed from voice emitting speaker 152 of phone 150 to a position more proximate to the microphone of BTE hearing aid 160 being worn by a user. Sound entrance aperture 102 is placed proximate the bottom of assistive hearing device 100. Sound egress aperture 104 is placed proximate the top end of assistive hearing device 100. Sound entrance aperture 102 and sound egress aperture 104 communicate with one another via a hollow interior 108 that extends through first portion 111, second portion 112, and angled transition portion 114. Sound entrance aperture 102 of assistive hearing device 100 surrounds voice emitting speaker 152 of phone 150 to capture sound from voice emitting speaker 152. As indicated by the arrows in FIG. 4, sound from voice emitting speaker 152 of phone 150 enters sound entrance aperture 102, is conducted through hollow interior 108 of assistive hearing device 100, and exits sound egress aperture 104 proximate the microphone of BTE hearing aid 160. As such, sound (such as the voice of a caller) can be better picked-up by BTE hearing 160 aid and the user is able to better hear the voice of the caller via BTE hearing aid 160 when using phone 150.

Referring to FIGS. 4A-4C, various views of assistive hearing device 100 coupled with band 110 are shown. Band 110 can have a thickness B of approximately 0.08 inches, a minimum width of approximately 0.50 inches, and a maximum width E of approximately 0.98 inches. Assistive hearing device 100 can have a width A of approximately 1.19 inches at the top and a height F of approximately 2.09 inches, with the molded arcs having a width C of approximately 0.87 inches. Second portion 112 is preferably offset from first portion 111 by a distance G of approximately 0.63 inches.

Referring to FIGS. 5A-5C, alternatively, assistive hearing device 100' has a band 110' that includes sound openings 130, a lever 132, and a sliding cover 134. Sound openings 130 are for a user without the need for BTE hearing aid 160. Sound openings 130 can be opened or closed by moving sliding cover 134 with lever 132. In a closed position, sliding cover 134 covers sound openings 130. In an open position, sound from voice emitting speaker 152 of phone 150 may be transmitted through sound openings 130 and directly to the ear of a user adjacent to the ear opening leading to the ear canal.

Figures 6A, 6B:
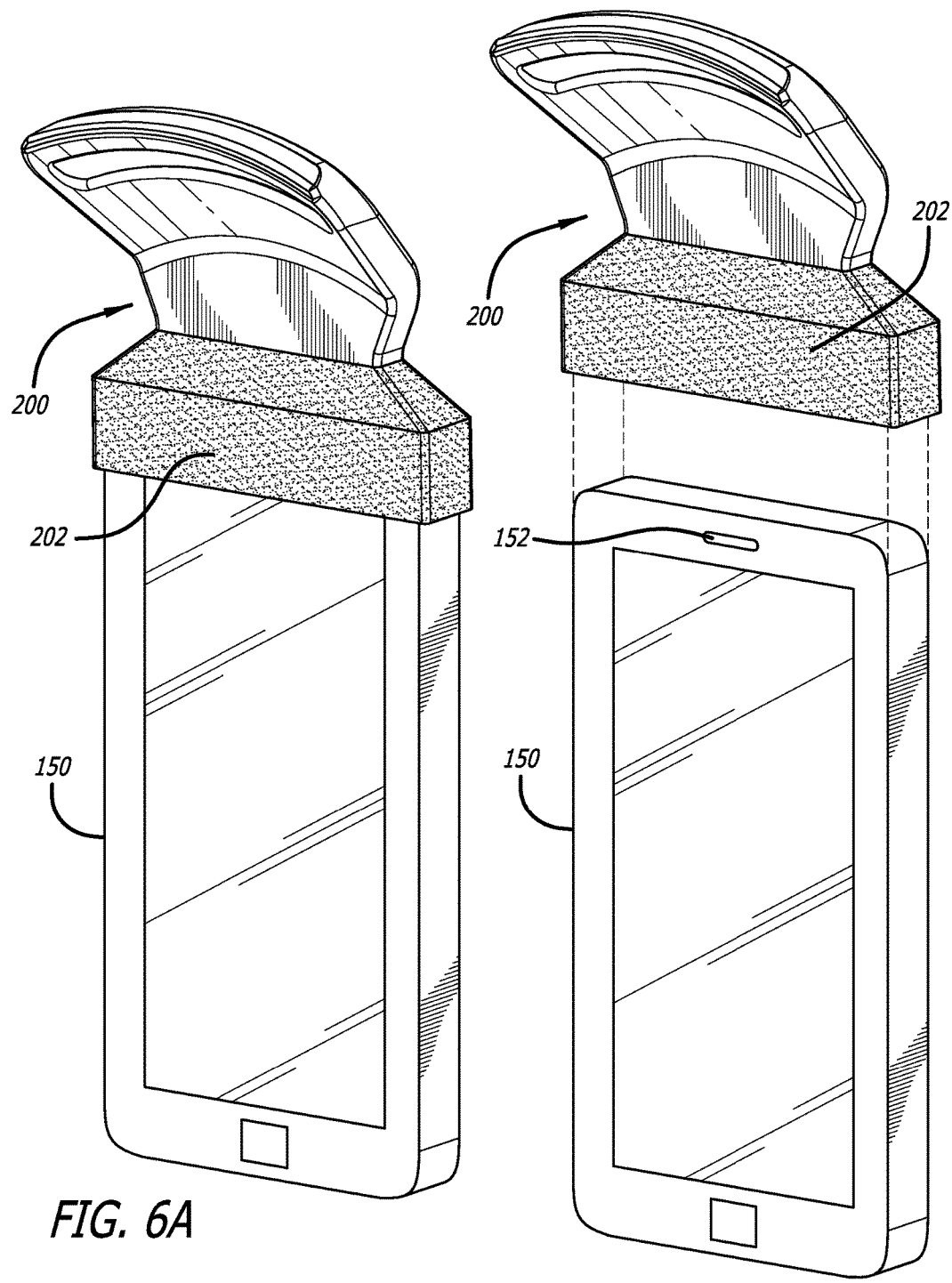
FIG. 6A is a front perspective view of a telephone with a third embodiment of an assistive hearing device of the present invention including a sleeve that fits over the end of the telephone.
FIG. 6B is an exploded front perspective view of the telephone with the third embodiment of an assistive hearing device of FIG. 6A including the sleeve that fits over the end of the telephone.

Referring to FIGS. 6A and 6B, another preferred embodiment of an assistive hearing device is generally referred to by the number 200. Assistive hearing device 200 includes a sleeve 202 that fits over the end of phone 150, preferably surrounding voice emitting speaker 152 of phone 150. Sleeve 202 is configured to form a friction fit with the end of phone 150. Sound from phone 150 is conducted through assistive hearing device 200 to BTE hearing aid 160 in a similar manner described above in connection with assistive hearing device 100.

Figure 7A:
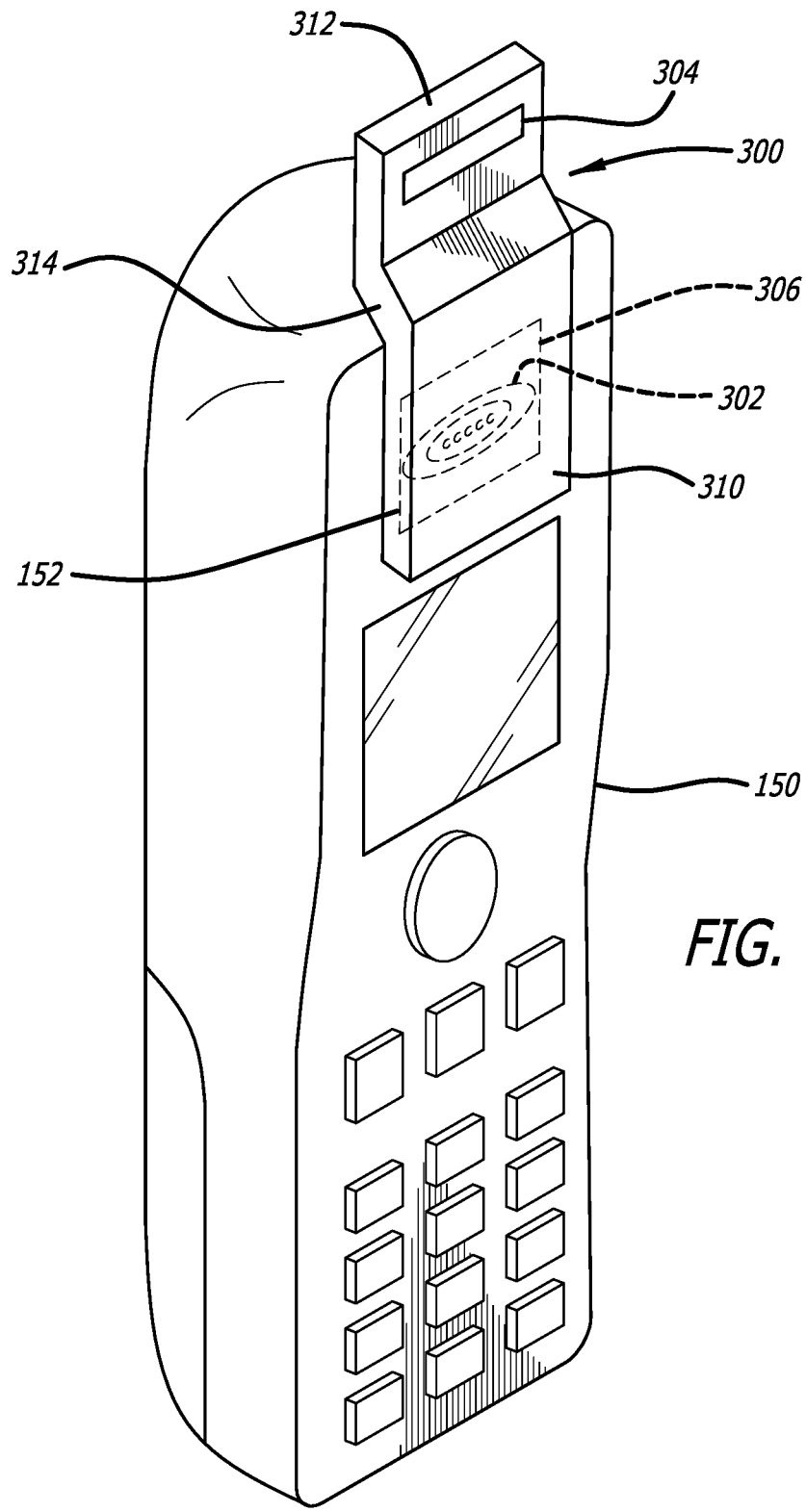
FIG. 7A is a front perspective view of a telephone with a fourth embodiment of an assistive hearing device of the present invention having an angled configuration.
Figure 7B:
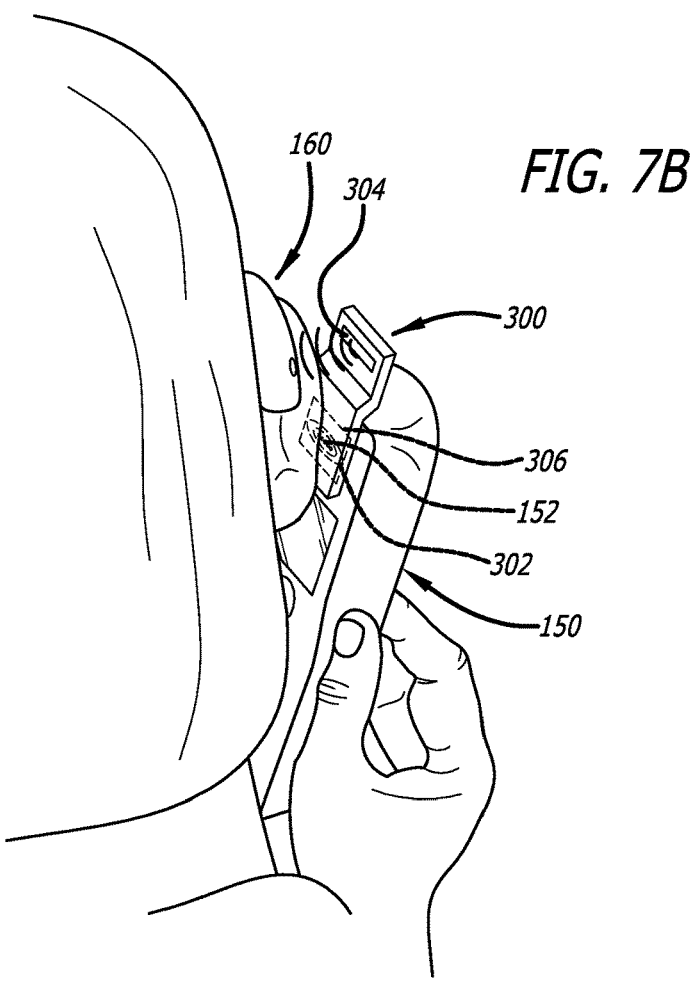
FIG. 7B is a side perspective view of the telephone with the fourth embodiment of the assistive hearing device of FIG. 7A in use by a user wearing the BTE hearing aid, the sound emanating from an egress aperture of the assistive hearing device placed in proximity to the BTE hearing aid of the user.
Figure 7C:
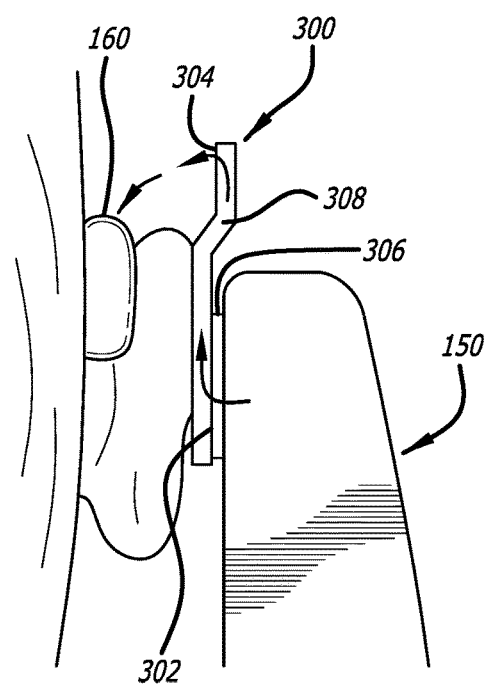
FIG. 7C is a side elevational view of the telephone with the fourth embodiment of the assistive hearing device of FIG. 7A, the arrows illustrating a direction of sound generated from the voice emitting speaker of the telephone traveling into a sound entrance aperture, through a hollow interior of the assistive hearing device, out of a sound egress aperture, and to the BTE hearing aid of the user.

Referring to FIG. 7A-7C, another preferred embodiment of an assistive hearing device is generally referred to by the number 300. Assistive hearing device 300 includes a sound entrance aperture 302, a sound egress aperture 304, an adhesive portion 306, and a hollow interior 308. In a preferred embodiment, sound entrance aperture 302 is proximate, but spaced apart from one end of assistive hearing device 300. Sound egress aperture 304 is proximate, but spaced apart from the opposite end of assistive hearing device 300. Sound entrance aperture 302 and sound egress aperture 304 are on opposite facing sides of assistive hearing device 300. Assistive hearing device 300 includes a first portion 310, a second portion 312, and an angled transition portion 314. Assistive hearing device 300 preferably has an angled or offset configuration with first portion 310 adapted to be coupled to phone 150 and second portion 312 being offset from first portion 310. Second portion 312 extends beyond phone 150 when assistive hearing device 300 is coupled to a phone 150.

Figure 10:
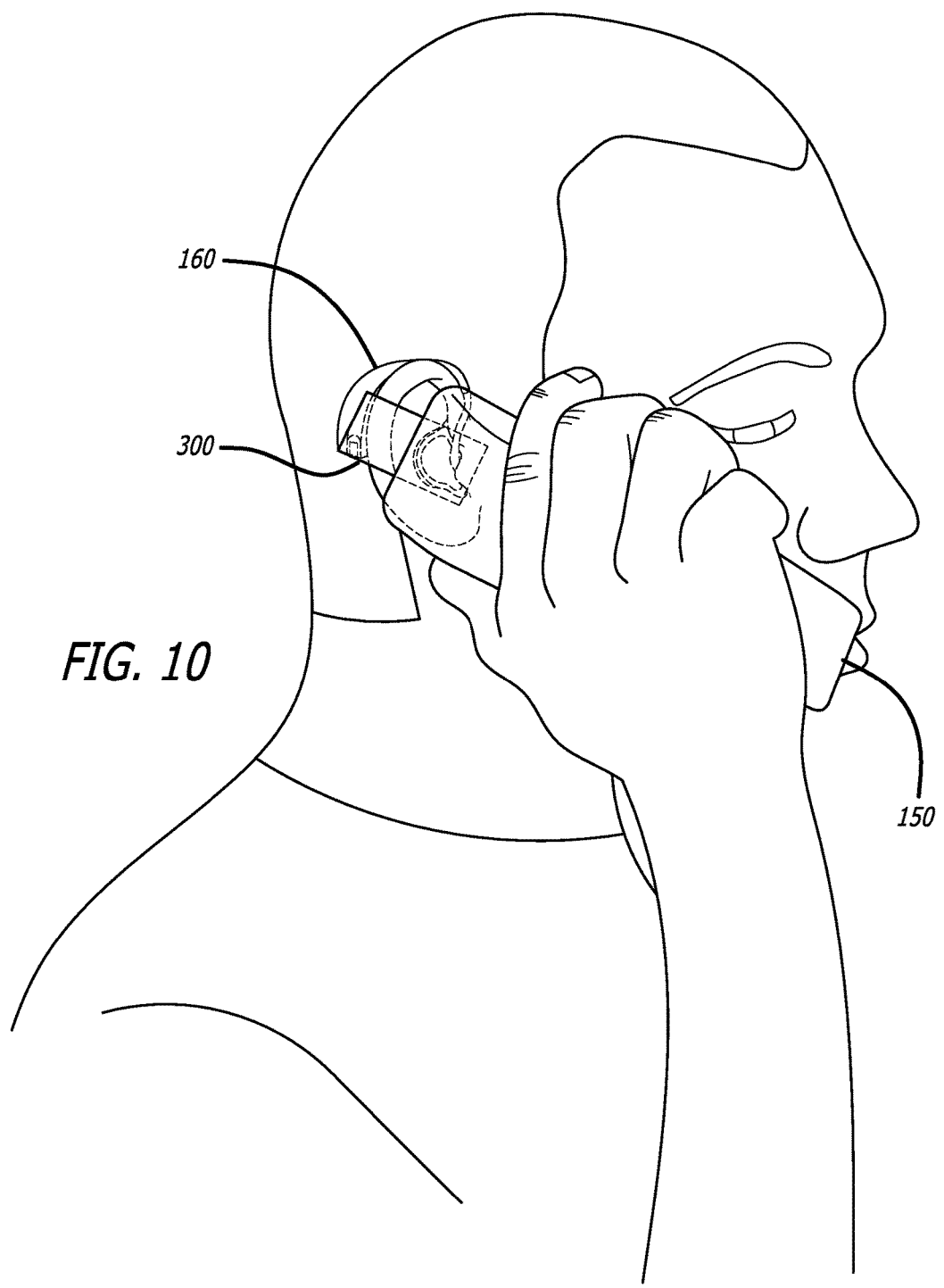
FIG. 10 is a rear perspective view of the telephone with the fourth embodiment of the assistive hearing device of FIG. 7A, showing the sound egress aperture positioned in proximity of the BTE hearing aid of the user.
Figure 13A:
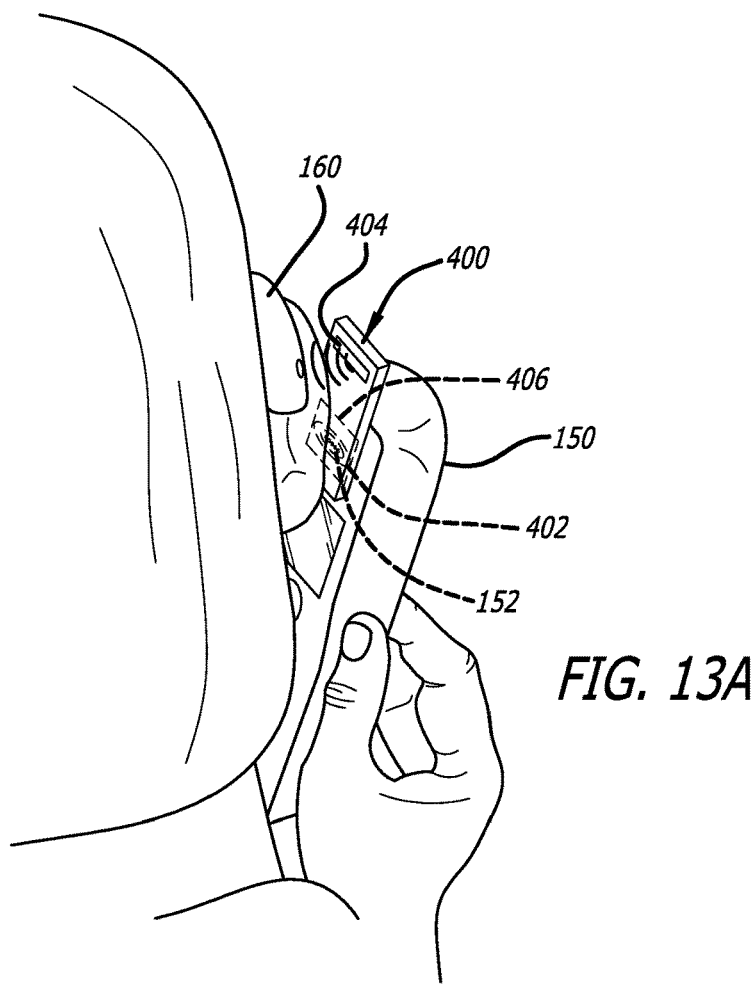
FIG. 13A is a side perspective view of the telephone with the fifth embodiment of the assistive hearing device having a straight configuration in use by a user wearing a BTE hearing aid, the sound emanating from a sound egress aperture of the assistive hearing device placed in proximity to the BTE hearing aid of the user.
Figure 13B:
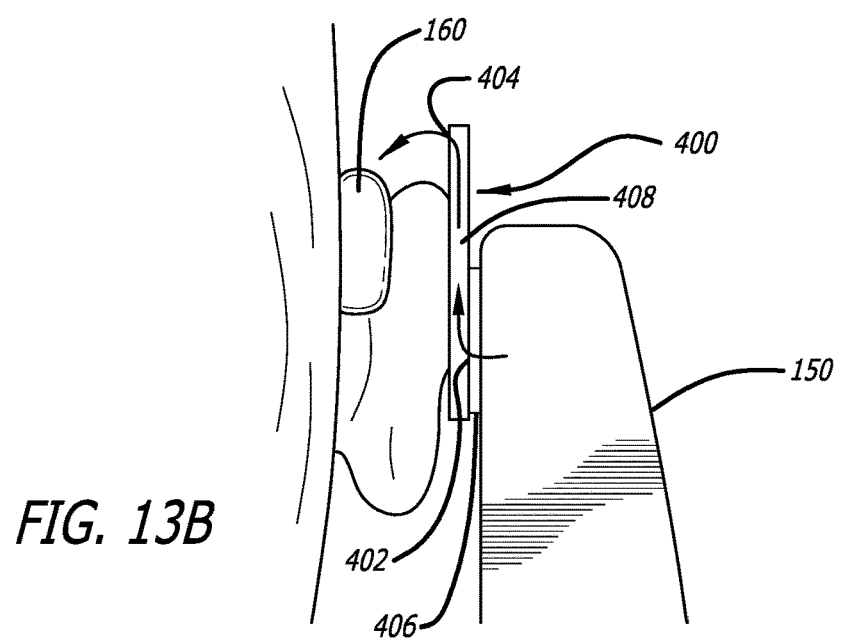
FIG. 13B is a side elevational view of the telephone with the fifth embodiment of the assistive hearing device of FIG. 11, the arrows illustrating a direction of sound generated from the voice emitting speaker of the telephone traveling into a sound entrance aperture, through a hollow interior of the assistive hearing device, out of the sound egress aperture, and to the BTE hearing aid of the user.

Referring to FIGS. 7B, 7C, and 10, with assistive hearing device 300 coupled to phone 150, sound can be directed from voice emitting speaker 152 of phone 150 to a position more proximate to the microphone of BTE hearing aid 160 being worn by a user. As indicated by the arrows in FIG. 7C, sound from voice emitting speaker 152 of phone 150 enters sound entrance aperture 302, is conducted through hollow interior 308 of assistive hearing device 300, and exits sound egress aperture 304 proximate the microphone of BTE hearing aid 160. As such, sound (such as the voice of a caller) can be better picked-up by BTE hearing aid 160 and the user is able to better hear the voice of the caller via the microphone of BTE hearing aid 160 when using phone 150.

Referring to FIGS. 8 and 9, assistive hearing device 300 is configured such that second portion 312 is offset approximately 0.25 inches from first portion 310 to permit sound egress aperture 304 to be positioned proximate BTE hearing aid 160. Angled transition portion 314 between first and second portions 310 and 312 creates the offset position of second portion 312 relative to first portion 310. The offset position of second portion 312 provides for the transmission of sound from sound egress aperture 304 towards BTE hearing aid 160 in a manner that is not impeded by the user's ear or any other portion other user's head against which phone 150 is placed. The offset configuration offers the added advantage of reducing the chances of muffling the sound in the event the user presses assistive hearing device 300 against a portion of the user's ear or head to block sound egress aperture 304.

In a preferred embodiment, assistive hearing device 300 is coupled to phone 150 by adhesive portion 306 which may be in the form of a closed cell foam "donut" seal that contains an adhesive material having an approximate thickness of ⅛ inches that bonds to a surface that surrounds sound entrance aperture 302. When placed on phone 150, adhesive portion 306 preferably surrounds voice emitting speaker 152 and adheres to phone 150. In this manner, assistive hearing device 300 is fixed relative to phone 150 and sound from voice emitting speaker 152 can be conducted through the seal created by adhesive portion 306 and into sound entrance aperture 302 for transmission through assistive hearing device 300.

Adhesive portion 306 preferably includes an adhesive material that removably bonds to a surface that surrounds sound entrance aperture 302 of assistive hearing device 300 to a surface of phone 150 that at least partially surrounds voice emitting speaker 152 of phone 150. Preferably, adhesive portion 306 includes an open area in communication with sound entrance aperture 302 and voice emitting speaker 152 to conduct sound transmitted from voice emitting speaker 152 through sound entrance aperture 302 and into hollow interior 308 of assistive hearing device 300. The adhesive material may be derived from any material with physical and/or chemical properties that facilitate attachment of a mobile phone surface to assistive hearing device 300. One or more removal strips (not shown) can be removably attached to the adhesive material. The removal strip may be constructed from any material with properties that allow the removal strip to be removably attached to the adhesive material without adversely affecting the adhesive properties of the adhesive material.

In a preferred embodiment, assistive hearing device 300 has a length in the range of approximately 2.5 inches to 3.0 inches, with 3.0 inches being preferred; a width in the range of approximately 0.5 inches to 1.0 inches, with 1.0 inches being preferred; and a depth of approximately 0.15 inches to 0.25 inches, with 0.25 inches being preferred. Sound entrance aperture 302 has a maximum dimension in the range of approximately 0.25 inches to 0.5 inches, with 0.5 inches being preferred. Sound egress aperture 304 has a maximum dimension in the range of approximately 0.5 inches to 1.0 inches, with 1.0 inches being preferred. Sound entrance aperture 302 and sound egress aperture 304 being spaced apart in the range of approximately 1.75 inches, with 1.75 inches being preferred.

In a preferred embodiment, assistive hearing device 300 is shown to have a generally rectangular configuration, but is not limited to such a configuration. Other shapes and configurations providing for a sound entrance aperture 302 on one side proximate one end, a sound egress aperture 304 on an opposite side proximate an opposite end, and communication therebetween via a hollow interior 308 suitable for the intended purpose of communicating sound from voice emitting speaker 152 to BTE hearing aid 160 or RIC hearing aid are within the scope of the present invention.

Referring to FIGS. 11, 12, 13A, 13B, 14, and 15, another preferred embodiment of assistive hearing device 400 is shown having a generally rectangular configuration similar to assistive hearing device 300, except without the offset. Accordingly, the description herein with respect to assistive hearing device 300 is applicable to assistive hearing device 300 and is incorporated here by reference. Reference numerals identifying features of assistive hearing device 400 that correspond to like reference numerals identifying features of assistive hearing device 300 are used to denote similar features.

Figure 16:
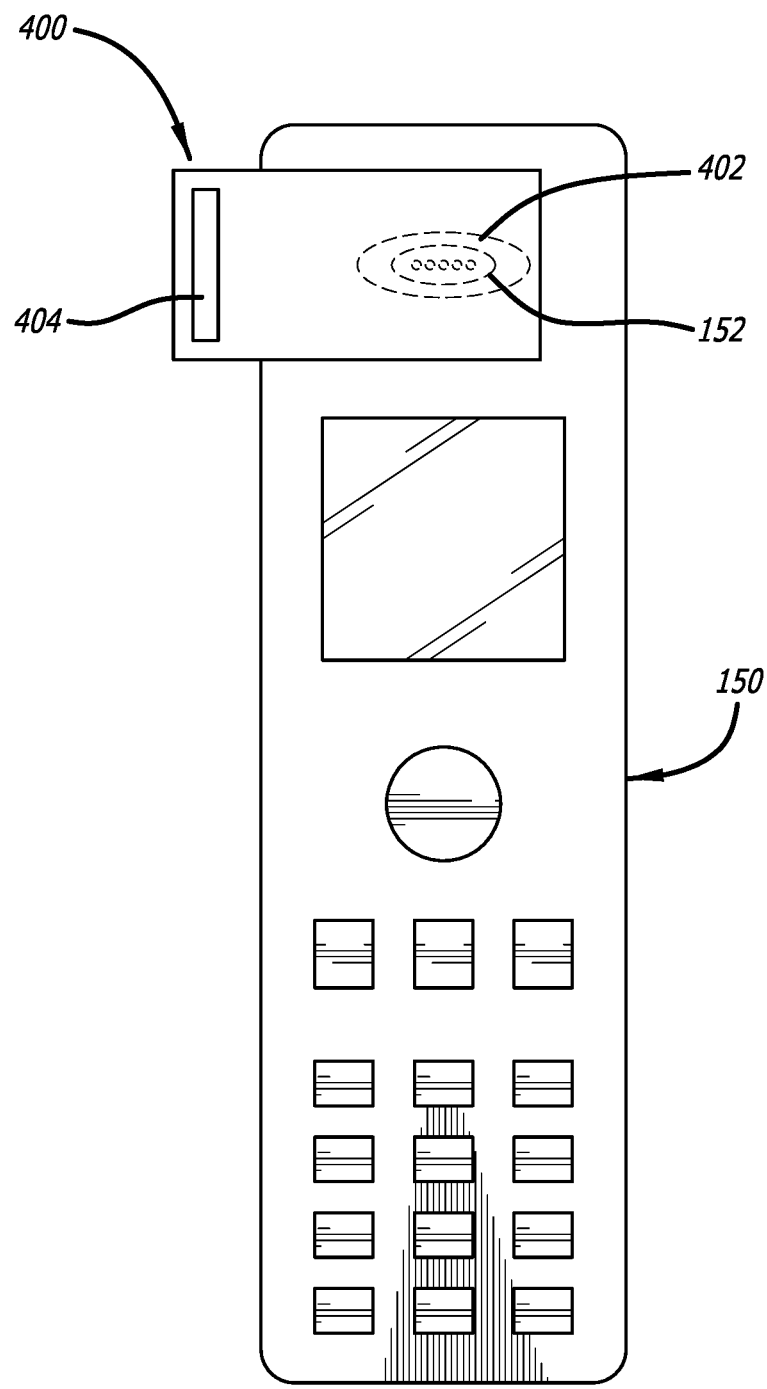
FIG. 16 is another front elevational view of the telephone with the fifth embodiment of the assistive hearing device of FIG. 11 oriented in a horizontal direction relative to the telephone.

Referring to FIG. 16, assistive hearing device 400 is shown in an alternative position when coupled to phone 150. In this positioning, assistive hearing device 400 is in a generally horizontal position with sound egress aperture 404 extending from a side of phone 150 as compared to the top of phone 150.

Figure 17:
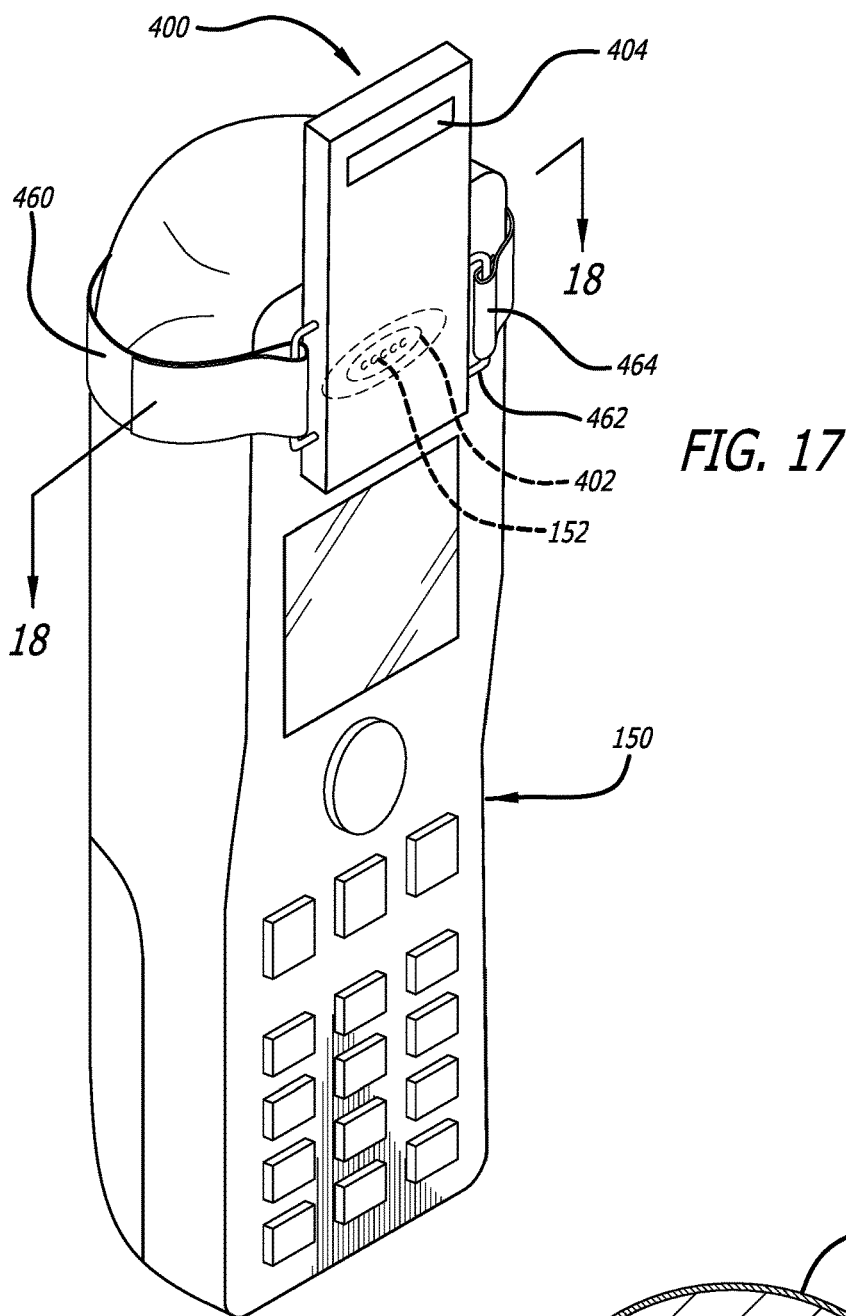
FIG. 17 is a front perspective view of a telephone with a sixth embodiment of the assistive hearing device attached to the telephone by a hook and loop strap.
Figure 18:
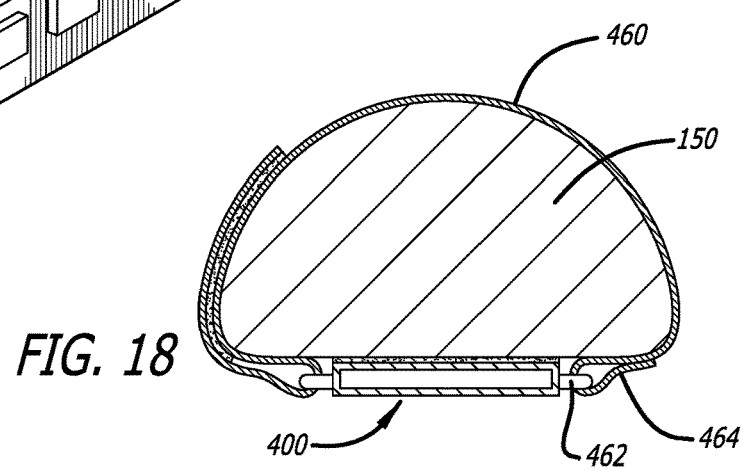
FIG. 18 is a cross-sectional view taken along line 18-18 of the telephone and the sixth embodiment of the assistive hearing device of FIG. 17.

Referring to FIGS. 17 and 18, assistive hearing device 400 alternatively may be secured to phone 150 via a strap 460. One end of strap 460 is secured to a first side of assistive hearing device 400 via a first loop connected to assistive hearing device 400. Strap 460 is then placed around phone 150 and the opposite end is secured to an opposite side of assistive hearing device 400 via a second loop connected to assistive hearing device 400. The end of strap 410 may be secured by hook and loop fasteners such as Velcro to prevent loosening. In this embodiment, assistive hearing device 400 may be secured to phone 150 with a hook and loop fasteners 462 and 464 to hold assistive hearing device 400 in position on phone 150.

Figure 19:
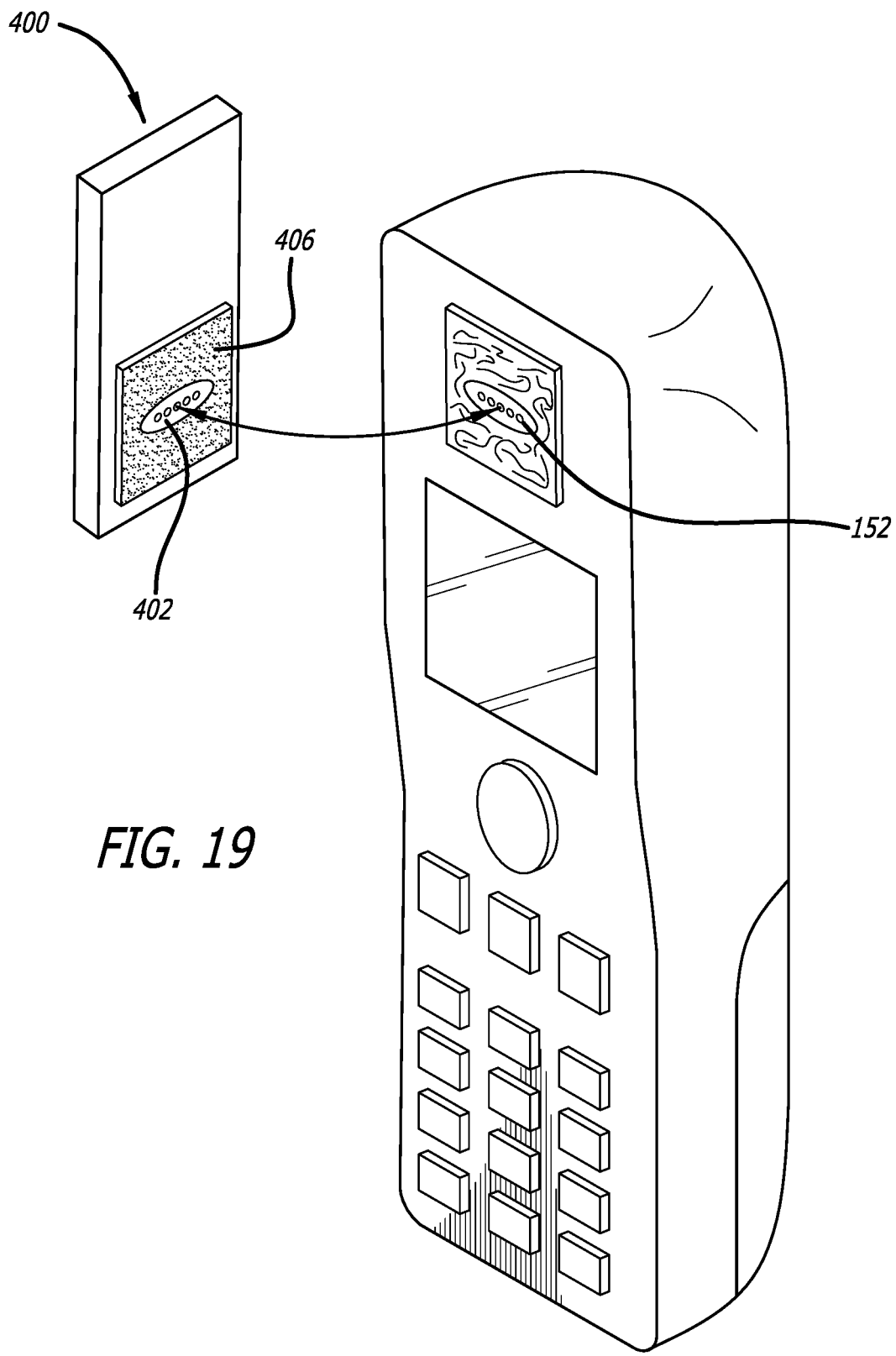
FIG. 19 is front perspective view of the telephone with one part of a hook and loop fastener around the sound entrance aperture and a rear perspective view of the fifth embodiment of the assistive hearing device of FIG. 11 with another part of the hook and loop fastener around the voice emitting speaker of the telephone.

Referring to FIG. 19, alternatively, adhesive portion 406 need not be used, but it is appreciated that a rubber seal may be secured to assistive hearing device 400 surrounding the sound entrance aperture 402 to facilitate transmission of the sound into assistive hearing device 400.

What is claimed is:

1. An assistive hearing device for use with a telephone, the telephone including at least a body portion and a voice emitting speaker, the assistive hearing device comprising:
   a case having a first end, a second end, a sound entrance aperture positioned proximate the first end, a sound egress aperture positioned proximate the second end, and a hollow interior providing for communication between the sound entrance aperture and the sound egress aperture, wherein the assistive hearing device is attached to the telephone such that the sound entrance aperture is positioned adjacent the voice emitting speaker, thereby allowing sound from the voice emitting speaker to be conveyed through the sound entrance aperture, through the hollow interior of the assistive hearing device, and through the sound egress aperture, wherein, when the assistive hearing device is attached to the telephone, the sound egress aperture of the assistive hearing device is positioned away from the telephone, and wherein, when a hearing aid is positioned on a human head at least partially behind a human ear and the voice sound egress aperture is positioned adjacent the human ear, the assistive hearing device transfers sound from the voice emitting speaker of the telephone through the sound egress aperture to the hearing aid.

2. The assistive hearing device of claim 1, wherein the assistive hearing device is attachable to the telephone using at least one of an elastic band, an adhesive material, and a hook and loop fastener.

3. The assistive hearing device of claim 1, further comprising a seal provided between the telephone and the assistive hearing device, the seal being positioned adjacent the voice emitting speaker and the sound entrance aperture, the seal affording transfer of sound therethrough from the voice emitting speaker to the sound entrance aperture.

4. The assistive hearing device of claim 1, wherein the assistive hearing device includes a first side and a second side opposite from one another, the sound entrance aperture being provided in the first side, and the sound egress aperture being provided in the second side.

5. The assistive hearing device of claim 1, wherein the hearing aid includes a microphone, and the assistive hearing device transfers sound from the voice emitting speaker of the telephone to the microphone of the hearing aid when the sound egress aperture is positioned adjacent the human ear.

6. An assistive hearing device for use with a phone, the phone including at least a body portion and a voice emitting speaker proximate an end of the phone, the assistive hearing device comprising:

a case having a first end, a second end, a sound entrance aperture positioned proximate the first end, a sound egress aperture positioned proximate the second end, and a hollow interior providing for communication between the sound entrance aperture and the sound egress aperture, the first end of the case being configured to fit over the end of the phone and to surround at least in part the voice emitting speaker of the phone, wherein the assistive hearing device is attached to the end of the phone such that the sound entrance aperture is positioned adjacent the voice emitting speaker, thereby allowing sound from the voice emitting speaker to be conveyed through the sound entrance aperture and through the hollow interior of the assistive hearing device and through the sound egress aperture, wherein, when the assistive hearing device is attached to the telephone, the sound egress aperture of the assistive hearing device is positioned away from the telephone, and wherein, when a hearing aid is positioned on a human head at least partially behind a human ear, and the sound egress aperture is positioned adjacent the human ear, the assistive hearing device transfers sound from the voice emitting speaker of the telephone through the sound egress aperture to the hearing aid.

7. The assistive hearing device of claim 6, wherein the first end of the case includes a sleeve configured to fit over the end of the phone and to surround at least in part the voice emitting speaker of the phone, the sleeve forming a friction fit with at least a portion of the end of the phone.

8. The assistive hearing device of claim 6, further comprising a seal provided between the telephone and the assistive hearing device, the seal being positioned adjacent the voice emitting speaker and the sound entrance aperture, the seal affording transfer of sound therethrough from the voice emitting speaker to the sound entrance aperture.

9. The assistive hearing device of claim 6, wherein the assistive hearing device includes a first side and a second side opposite from one another, the sound entrance aperture being provided in the first side, and the sound egress aperture being provided in the second side.

10. The assistive hearing device of claim 1, further comprising a securing mechanism configured to removably attach the assistive hearing device to the telephone.

11. The assistive hearing device of claim 6, further comprising a securing mechanism configured to removably attach the assistive hearing device to the telephone.

* * * * *